United States Patent
Hessler et al.

(10) Patent No.: US 10,165,544 B2
(45) Date of Patent: Dec. 25, 2018

(54) NETWORK NODE, WIRELESS DEVICE AND CORRESPONDING METHODS FOR PAGING THE WIRELESS DEVICE

(71) Applicant: Telefonaktiebolaget LM Ericsson (publ), Stockholm (SE)

(72) Inventors: Martin Hessler, Linköping (SE); Erik Eriksson, Linköping (SE); Pål Frenger, Linköping (SE); Jianfeng Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 14/916,386

(22) PCT Filed: Dec. 16, 2015

(86) PCT No.: PCT/SE2015/051359
§ 371 (c)(1),
(2) Date: Mar. 3, 2016

(87) PCT Pub. No.: WO2017/105305
PCT Pub. Date: Jun. 22, 2017

(65) Prior Publication Data
US 2017/0257842 A1    Sep. 7, 2017

(51) Int. Cl.
*H04W 68/00* (2009.01)
*H04W 68/02* (2009.01)
(Continued)

(52) U.S. Cl.
CPC ......... *H04W 68/005* (2013.01); *H04W 56/00* (2013.01); *H04W 56/001* (2013.01);
(Continued)

(58) Field of Classification Search
CPC .. H04W 68/005; H04W 68/02; H04W 56/001
See application file for complete search history.

(56) References Cited

U.S. PATENT DOCUMENTS

| 8,260,328 B1 | 9/2012 | Yellin et al. |
| 2006/0172747 A1 | 8/2006 | Mohammed |

(Continued)

FOREIGN PATENT DOCUMENTS

WO    2014189279 A1    11/2014

OTHER PUBLICATIONS

Nokia Networks, "Further considerations for DRX cycle configurations for idle mode", 3GPP TSG RAN WG Meeting #91, R2-153121, 3rd Generation Partnership Project (3GPP), Mobile Competence Centre, 650 Route des Lucioles, F-06921 Sophia-Antipolis Cedex, France, Aug. 23, 2015, 4 pages.

(Continued)

*Primary Examiner* — Kamran Afshar
*Assistant Examiner* — Minjung Kim
(74) *Attorney, Agent, or Firm* — Rothwell, Figg, Ernst & Manbeck, p.c.

(57) ABSTRACT

A wireless device, a network node and methods therein are provided for paging in a wireless communication network. The method in the wireless device comprises determining a paging window for receiving at least part of a paging transmission. The method further comprises receiving at least one paging synchronization signal, PaSS, comprised in the paging transmission, in said paging window; and further receiving at least one paging message comprised in the paging transmission, based on the received at least one PaSS.

28 Claims, 9 Drawing Sheets

(51) Int. Cl.
   *H04W 56/00*   (2009.01)
   *H04W 52/02*   (2009.01)
   *H04W 76/28*   (2018.01)

(52) U.S. Cl.
   CPC ......... *H04W 68/02* (2013.01); *H04W 68/025* (2013.01); *H04W 52/0216* (2013.01); *H04W 52/0287* (2013.01); *H04W 76/28* (2018.02); *Y02D 70/00* (2018.01); *Y02D 70/1242* (2018.01); *Y02D 70/1262* (2018.01); *Y02D 70/142* (2018.01); *Y02D 70/21* (2018.01); *Y02D 70/24* (2018.01); *Y02D 70/25* (2018.01)

(56) References Cited

U.S. PATENT DOCUMENTS

| | | | | |
|---|---|---|---|---|
| 2010/0040015 A1* | 2/2010 | Ernstrom | ............... | H04W 56/00 370/330 |
| 2010/0137007 A1* | 6/2010 | Kojima | ................ | H04W 68/02 455/458 |
| 2010/0165873 A1* | 7/2010 | Higuchi | ................ | H04W 48/12 370/254 |
| 2010/0317374 A1* | 12/2010 | Alpert | ................... | H04W 68/02 455/458 |
| 2012/0300655 A1* | 11/2012 | Lee | ....................... | H04W 24/00 370/252 |
| 2013/0301501 A1 | 11/2013 | Olvera-Hernandez et al. | | |
| 2014/0095675 A1* | 4/2014 | Tomala | ................ | H04W 24/10 709/220 |
| 2015/0173122 A1 | 6/2015 | Schliwa-Bertling et al. | | |
| 2016/0119895 A1* | 4/2016 | Agiwal | ................ | H04B 7/0408 455/458 |

OTHER PUBLICATIONS

International Search Report and Written Opinion issued in International application No. PCT/SE2015/051359 dated Sep. 16, 2016, 14 pages.

Supplementary European Search Report issued in European Patent Application No. 15910861.2 dated Nov. 12, 2018, 4 pages.

* cited by examiner

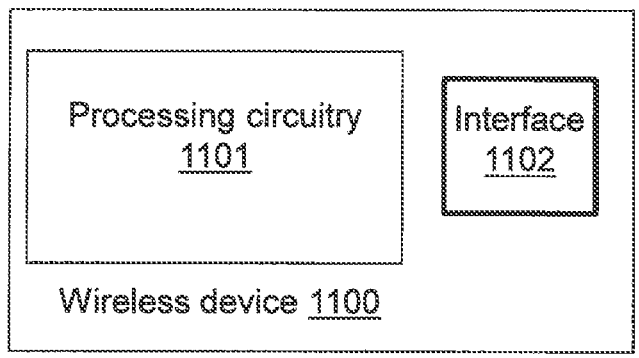
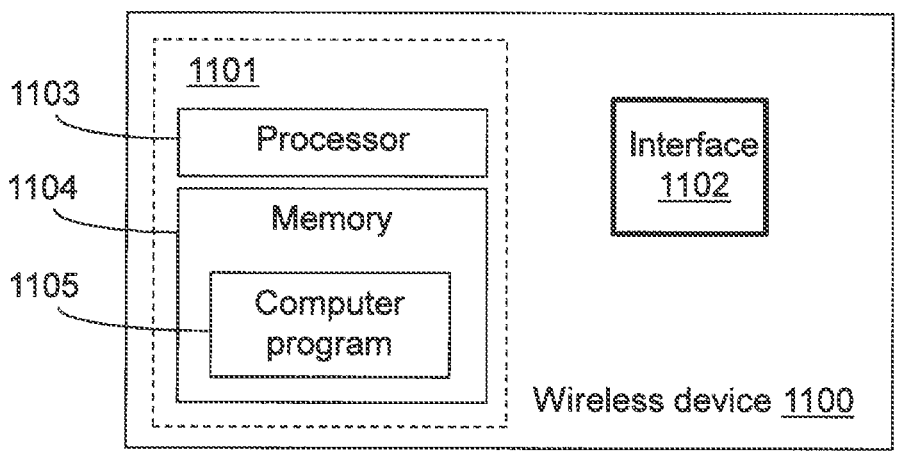
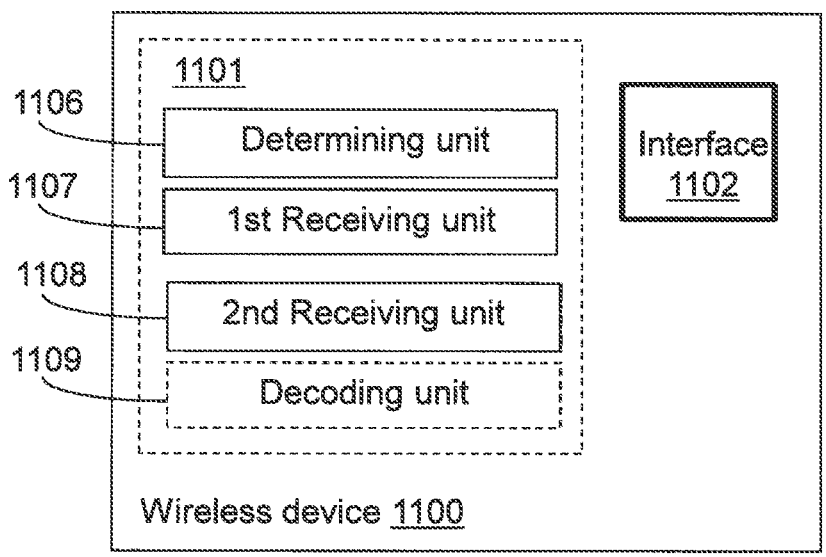

NETWORK NODE, WIRELESS DEVICE AND CORRESPONDING METHODS FOR PAGING THE WIRELESS DEVICE

CROSS-REFERENCE TO RELATED APPLICATION

This application is a 35 U.S.C. § 371 National. Phase Entry Application from PCT/SE2015/051359, filed Dec. 16, 2015, and designating the United States.

TECHNICAL FIELD

The embodiments described herein relate generally to a wireless device and a network node in a wireless communication network and to methods performed in the wireless device and the network node. In particular embodiments herein relate to paging said wireless device in the wireless communication network.

BACKGROUND

In a typical wireless communication network, wireless devices, also known e.g. as user equipments (UEs), communicate via a Radio Access Network (RAN) to one or more core networks. The RAN covers a geographical area which traditionally is divided into cell areas, with each cell area being served by a network node such as a radio access node or base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not co-located. Each cell is identified by an identity within the local radio area, which is broadcast in the cell. Another identity identifying the cell uniquely in the whole wireless communication network is also broadcasted in the cell. One network node may have one or more cells. The network nodes communicate over the air interface operating on radio frequencies with the wireless devices within range of the network nodes with downlink transmissions towards the wireless devices and uplink transmission from the wireless devices.

A Universal Mobile Telecommunications System (UMTS) is a third generation wireless communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several network nodes may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the network nodes, such as radio access nodes or base stations, are directly connected to the EPC core network rather than to RNCs. In general, in E-UTRAN/LTE the functions of a RNC are distributed between the radio access nodes or base stations, e.g. eNodeBs in LTE, and the core network. As such, the Radio Access Network (RAN) of an EPS has an essentially "flat" architecture comprising radio access nodes that do not report to RNCs.

The 3GPP initiative "License Assisted Access" (LAA) aims to allow LTE equipment to operate in an unlicensed 5 GHz radio spectrum. The unlicensed 5 GHz spectrum is used as an extension to the licensed spectrum. For example, wireless devices may connect in the licensed spectrum to a primary cell (PCell), and use carrier aggregation to benefit from additional transmission capacity in the unlicensed spectrum in a secondary cell (SCell). To reduce the changes required for aggregating licensed and unlicensed spectrum, an LTE frame timing in the primary cell may simultaneously be used in the secondary cell.

Regulatory requirements, however, may not permit transmissions in the unlicensed spectrum without prior channel sensing. Since the unlicensed spectrum must be shared with other radios of similar or dissimilar wireless technologies, a so called Listen-Before-Talk (LBT) method needs to be applied. Today, the unlicensed 5 GHz spectrum is mainly used by communication terminals implementing the IEEE 802.11 Wireless Local Area Network (WLAN) standard. This standard is known under its marketing brand "Wi-Fi."

IEEE 802.11 equipment, also called WLAN equipment, uses a contention based medium access scheme. This scheme does not allow a wireless medium to be reserved at specific instances of time. Instead, IEEE 802.11 equipment or IEEE 802.11 compliant devices only support the immediate reservation of the wireless medium following the transmission of at least one medium reservation message, e.g. Request to Send (RTS) or Clear to Send (CTS) or others. To allow the Licensed Assisted (LA)-LTE frame in the secondary cell to be transmitted at recurring time intervals that are mandated by the LTE frame in the primary cell, the LAA system transmits at least one of the aforementioned medium reservation messages to block surrounding IEEE 802.11 equipment from accessing the wireless medium.

A wireless device in a communication network may enter a so-called idle mode, in which it does not actively communicate with network nodes. In idle mode, wireless devices may move through the communication network without performing explicit handovers when moving from an area covered by one network node, e.g. a radio access node or a base station, into an area covered by another network node, e.g. another radio access node or base station. When the network node needs to reach a wireless device which is in idle mode, e.g. when someone is making a phone call to the wireless device, a so-called "paging" is performed. To perform the paging, i.e. to page the wireless device, a network node sends a paging message when the wireless device is assumed to be located within the coverage area of the network node. The paging message comprises an identity, which may be used by the wireless device to recognize the paging message as a paging message targeting the wireless device. When no reply is received from the wireless device when paged in the coverage area of a cell served by the network node, the wireless device may be paged in an increased number of cells, which may or may not be served by the same network node, e.g. until the wireless device responds or until the wireless device has been paged in a certain area. According to current 3GPP standards, the network configures in which sub-frames a wireless device should wake up and listen for paging. Such a configuration is performed when the wireless device is in connected mode, and is then applied when the wireless device is in idle mode.

In LTE, so far, a wireless device in idle mode listens for reference signals, such as primary and secondary synchronization signals of a cell, in order to "camp" on the cell while being in the coverage area of the cell. The expression "to camp on a cell" implies that the wireless device has retrieved, by listening to cell-specific reference signals, knowledge of the configuration of the cell, including a physical cell ID of the cell and information enabling initial access to the cell, such as a demodulation sequence, random access configuration and power control settings, etc. When a wireless device in idle mode moves into the coverage area of a new cell, possibly served by a new network node, it listens for reference signals related to the cell in order to camp on the new cell. By camping on a cell, the wireless device is synchronized with the cell and is able to receive and decode paging messages transmitted in the cell. While camping on a specific cell, the wireless device does not listen for reference signals related to other cells or network nodes.

Today, at least in LTE networks, a network node, e.g. a radio access node or a base station, sends cell-specific reference signals in the whole coverage area of a cell associated with the network node at regular intervals. However, in future implementations of wireless communication networks, the coverage area of a "cell" of a network node is expected to be more dynamic, e.g. due to the introduction of advanced beam forming solutions. That is, a predefined coverage area of a network node, i.e. what today is known as a cell, will not be continuously covered anymore. Instead coverage is expected to be provided where needed in a coverable area. Further, contention based access is expected to be implemented, which implies that radio resources cannot be constantly dedicated, in a pre-determined manner, for a certain type of transmissions such as downlink control channels and paging channels. Furthermore, it is expected that a wireless device that is not in connected mode need not necessarily be in idle mode according to the conventional understanding of what is meant by being in idle mode. As an example, a wireless device may be in a "dormant mode", where the wireless device keeps its context without being available to communicate with the wireless communication network as would be done when being in connected mode.

Further, a future communication network scenario is expected to comprise a very large number of machine-type-communication (MTC) devices. Many such devices are expected to transmit small amounts of uplink (UL) data, e.g. 100 bits, more seldom, e.g. once per hour, or more often, e.g. once every second. In general, such devices often have high requirements on battery life, i.e. on low energy consumption, and also on low cost. These requirements imply that efficient and long discontinuous reception (DTX) and transmission (DTX) cycles, i.e. periods when the devices are in non-active, e.g. idle or dormant, mode, are wanted, and also that the MTC devices should preferably be operated on a small bandwidth, both for energy and cost reasons.

Further, in future communication networks solutions, e.g. what may be referred to as 5G, network nodes can potentially be configured in different ways to meet different service requirements. In fact, in 5G the network will most likely make use of different configurations depending e.g. on the radio services around a network node. In addition to the different configurations of network nodes, wireless devices may also be of different capabilities and also be configured for different behavior. This may lead to problems in certain situations, such as when a wireless device should "wake up" from a non-active mode, such as idle mode or a dormant mode, and listen for paging messages. For example, when a wireless device wakes up to monitor for signaling from the network, e.g. for paging, the configuration of the network node that the wireless device can receive paging from may have changed compared to when the wireless device was configured by the network for paging. The network node may or may not be same as when the wireless device went into non-active mode, meaning that the configuration of the network node may have changed due to re-configuration of the network node and/or due to mobility of the wireless device.

Consequently, in future communication systems as described above, wireless devices in idle mode would no longer be reached by a paging mechanism relying on that paging messages are scheduled for transmission over the radio interface according to a in the wireless device a priori known timing, as done according to e.g. currently used 3GPP standards for communication.

SUMMARY

An object of embodiments herein is to provide a mechanism that allows for sufficient flexibility in timing and/or frequency allocation for the paging channel of a network node in a wireless communication network. A further object is to allow for more energy efficient operation both on network and wireless device side.

Further, embodiments described herein enable a wireless device to search for paging over multiple nodes with different bandwidth allocations, radio transmission settings and where the paging transmission may come from any set of nodes without prior knowledge in the wireless device.

The benefits of the, embodiments described herein are enabled by the use of an initial timing sync signal (PaSS) in combination with a relaxed timing requirement on the timing of the actual paging message. This solution enables a system to support multiple configurations not supported by current state of the art paging solutions.

According to a first aspect, a method is provided for receiving paging in a wireless communication network. The method is to be performed by a wireless device. The method comprises determining a paging window for receiving at least part of a paging transmission. The method further comprises receiving at least one paging synchronization signal, PaSS, comprised in the paging transmission, in said paging window; and further receiving at least one paging message comprised in the paging transmission, based on the received at least one PaSS.

According to a second aspect, a method is provided, which is to be performed by a network node. The method comprises, when paging of the wireless device is to be made: transmitting, in a paging window defined for a paging transmission, at least one paging synchronization signal, PaSS, comprised in the paging transmission. The method further comprises transmitting, as part of the paging transmission, at least one paging message, said at least one paging message being configured such that it is obtainable by the wireless device based on the at least one PaSS.

According to a third aspect, a wireless device is provided. The wireless device is configured to determine a paging window for receiving at least part of a paging transmission; and further to receive at least one paging synchronization signal, PaSS, comprised in the paging transmission, in said paging window. The wireless device is further configured to receive at least one paging message comprised in the paging transmission, based on the received at least one PaSS.

According to a fourth aspect, a network node is provided. The network node is configured to, when paging of the wireless device is to be made:

transmit, in a paging window defined for a paging transmission, at least one paging synchronization signal, PaSS, comprised in the paging transmission. The network node is further configured to transmit, as part of the paging transmission, at least one paging message, said at least one paging message being configured such that it is obtainable by the wireless device based on the at least one PaSS.

According to a fifth aspect, a computer program is provided, which comprises instructions which, when executed on at least one processor, cause the at least one processor to carry out the method according the first or second aspect.

According to a sixth aspect, a carrier is provided for carrying the computer program of the fifth aspect.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

FIGS. 11a-c illustrate different implementations of wireless devices according to exemplifying embodiments.

DETAILED DESCRIPTION

Figure 1:
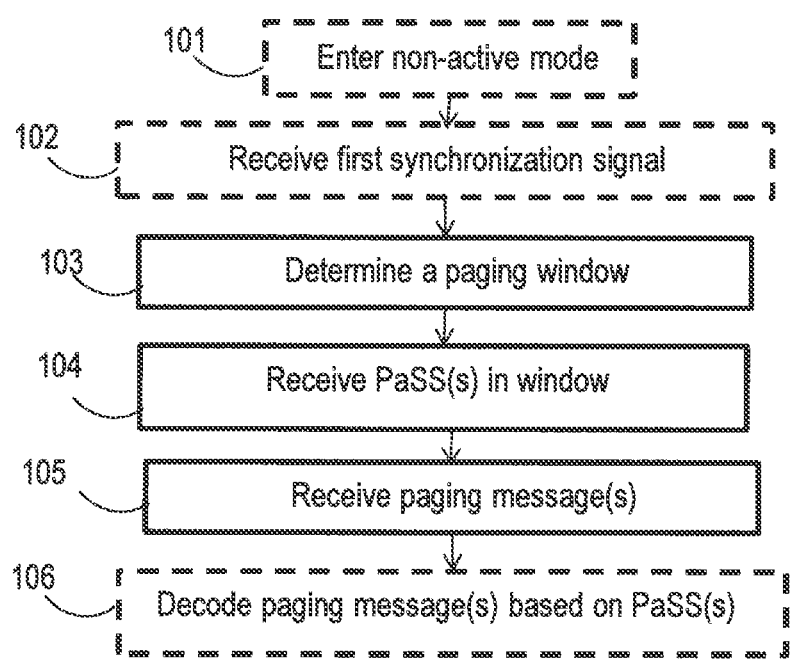
FIGS. 1 and 2 are flow charts showing a method performed by a wireless device according to exemplifying embodiments.

It is desirable to find a way to page wireless devices in communication systems also when applying "5G characteristics", such as advanced beamforming, contention based access, very long DRX/DTX periods, etc. Herein, a self-contained paging channel design that allows low wireless device energy consuming search for the paging channel, high flexibility in the bandwidth, timing and capacity of the paging channel, is proposed. By transmitting a known and potentially shared synchronization signal in advance to transmitting the paging message, and also introducing a searching window, or "paging window", in which the wireless devices are supposed to search for paging messages, wireless device energy consumption related to receiving and searching for paging messages may be reduced. This solution enables a long DRX/DTX while still maintaining the ability to transmit a flexible amount of data in the paging message, and also enables low cost search for the paging channel and allows flexibility in when the paging message is transmitted/received, which may be required either because the system or the wireless device has a changed timing or uncertainty in the timing of arrival of signals related to the paging.

As explained above, it is anticipated that the configuration of network nodes in a 5G scenario will vary from one network node to the other in order to meet a variety of different service requirements. Furthermore, it is anticipated that contention based access will be used on at least some frequency bands in order to enable radio resources to be shared among systems operating according to different radio access technologies (RATs). In such an environment, a wireless device in non-active mode will monitor which paging tracking area it is currently in by listening to downlink signaling from the network nodes that it is moving past. This downlink signaling will, however, not tell the wireless device anything about the identity or detailed configuration of the network nodes, e.g. for data transmissions. It is realized by the inventors that prior art paging methods will not work in this new type of networks. Therefore, a new paging concept is needed.

The embodiments of the invention addresses at least the following issues, partly related to using the current paging procedure, i.e. the one described in currently used 3GPP standards, in a communication network comprising network nodes of many different configurations:

According to the current paging procedure, the configuration of a timing, on sub-frame level, and a frequency allocation of a paging transmission needs to be known in advance by a wireless device. However, since these configurations could be different for different nodes in the 5G scenario, a wireless device in idle mode moving between cells, or coverage areas, of different network nodes will not be able to know the configuration for a new network node.

A long inactivity or idle period in discontinuous reception/transmission (DRX/DTX) enables the wireless device to sleep (be inactive) for a long time. This means that for a given clock quality in the wireless device, the error in the synchronization of the paging will increase with an increased idle period. If a longer idle DRX/DTX period, as compared e.g. to a currently standardized idle DRX/DTX period, is enabled for wireless devices, such as in a massive MTC case, the timing error would increase the paging failure rate because of the synchronization problem.

Contention based carriers will be a part of 5G networks. The bandwidth of contention based carriers will not be reserved for a specific transmission. A network node may transmit on a contention based carrier if the carrier is available, i.e. free. On a contention-based carrier, used e.g. by multiple Radio Access Technologies (RATs), the paging on a pre-scheduled time and frequency occasion would be impossible, since there is no guarantee that the frequencies in question will be free for paging at the pre-scheduled time.

The current paging procedure is performed in a broadcast fashion that is not designed to scale with many antenna elements. Further, the current paging procedure does not utilize multipoint transmission gains even when transmitting over a large area. Within massive MIMO systems with a large number of antenna elements, it is necessary for a wireless device to detect the paging information from a number of beams transmitted with low power.

In summary, it may be concluded that it is impossible to provide for sufficiently flexible node-specific bandwidth and timing as required for the paging channel in 5G systems with current state of the art solutions.

Within the context of this disclosure, the term "wireless device", and also the term "UE" used in some examples, encompasses any type of device or node which is able to communicate with a network node, such as a radio access node or base station, and/or with another wireless device, by transmitting and/or receiving wireless signals. Thus, the terms "wireless device" and "UE" encompass, but are not limited to: a user equipment, a mobile terminal, a tablet, a laptop, a wireless device for machine-to-machine communication, an integrated or embedded wireless card, an externally plugged in wireless card, a dongle, etc. For example, a wireless device may be embedded in a vessel, such as a ship, a flying drone, an airplane or a road vehicle, such as a car, bus or lorry. Such an embedded device could belong e.g. to a vehicle telematics unit or vehicle infotainment system.

The expression "network node", as used in this disclosure is intended to encompass any type of radio access node or base station, e.g. an eNB, NodeB, a pica or micro node, Home eNodeB or Home NodeB, or any other type of network node which is capable of wireless communication with a wireless device.

Below, when referring to paging in any way, it will be paging mechanism according to the teaching of this disclosure that is meant, if not explicitly stated otherwise, e.g. by use of formulations like "current paging method" or "state of the art paging".

Exemplifying Embodiments

Embodiments herein relate to a method for paging in a wireless communication network. Exemplifying embodiments will first be described from the perspective of a wireless device, and then from the perspective of a network node.

FIG. 1 illustrates a method for receiving paging performed by a wireless device operable in a wireless communication network. The paging is received when the wireless device is in idle or non-active mode, which is illustrated in FIG. 1 by the action of entering idle mode or "non-active" or "dormant" mode 101. The action 101 is illustrated with a dashed border, since the entering of the non-active mode, for example idle mode or dormant mode, is not really part of the paging procedure, but illustrates circumstances in which the method may be used, in order to facilitate understanding. Generally herein, actions illustrated with a dashed outline are not mandatory, but may be an optional feature, or be an example out of a number of different alternatives.

The wireless device may, at some point in time, receive 102 a first synchronization signal from the wireless communication network. The first synchronization signal does not need to be dedicated to paging and is not required to provide any other information than a network time reference, which may be a low accuracy network time reference for use in non-active mode. As an example, the network time reference may be provided in form of an absolute timing from a "global clock", valid in part of or the entire network. The first synchronization signal may be assumed to be e.g. a network synchronization signal transmitted from any network node, i.e. not necessarily the same network node as the one that transmits signals related to the paging.

The method illustrated in FIG. 1 comprises determining 103 a paging window for receiving at least part of a paging transmission. The paging window may be determined in relation to the received first synchronization signal. To determine the paging window, the wireless device may be configured with one or more parameters that determine the paging window in relation to the first synchronization signal. Such parameters may for example be: an offset in time relative to the first synchronization signal; a location in frequency, such as a frequency range, for the paging window; a length in time of the paging window; and/or a periodicity in time and/or frequency of the paging window. In one example, the length and position of the paging window may be expressed in units of the timing provided by the "global clock". For example, with a "global dock" providing a network time reference in seconds, the wireless device may be configured with a paging window having a periodicity of 2, meaning that it occurs every other second. If the length of the paging window is set to 25 milliseconds (msec), the wireless device will listen for PaSS for 25 msec every other second. If a PaSS is received, the wireless device may also expect to receive a paging message following the PaSS. If no PaSS is received the wireless device will assume that no paging message is transmitted. To determine when to listen for paging, i.e. to determine when a paging window occurs, the wireless device may step a counter at a pace in agreement with the granularity of the "global clock", e.g. by counting in units of seconds, starting from or calibrating to the network time reference provided by the first synchronization signal. The first synchronization signal may as an example be a signal provided by the wireless communication network at a periodicity of once every 100 milliseconds. The first synchronization signal may in some embodiments be a system signature index (SSI) sequence used by the wireless device to verify tracking area.

The method illustrated in FIG. 1 further comprises, in accordance with the above example, receiving 104 at least one paging synchronization signal, PaSS, in the determined paging window. The PaSS is comprised in the paging transmission, i.e. is a part of the paging transmission, which comprises at least a PaSS and a paging message. The PaSS is specific for paging transmissions. The method further comprises receiving 105, based on the at least one PaSS, at least one paging message comprised in the paging transmission. The method may further comprise decoding 106 the received at least one paging message, based on the at least one PaSS.

The method for paging described herein is self-contained for a wireless device in idle, dormant or non-active mode. By self-contained is here meant that all required reference signals and control information is contained in the paging transmission, which may comprise one or more paging messages, one or more PaSS, demodulation pilots and other reference signals, control channels (if any needed to decode the paging message or paging messages), including time and frequency synchronization.

Figure 2:
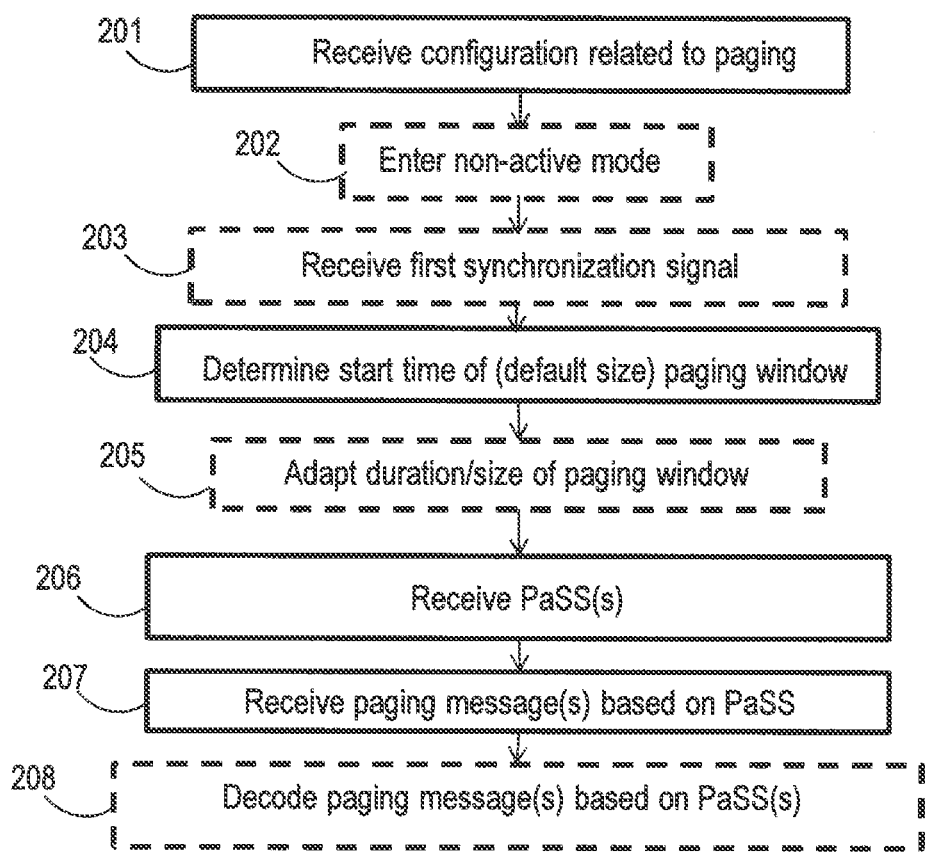

The wireless device will need to have some a-priori knowledge of the PaSS and the receiving of the PaSS. For example, the criteria for determining a paging window based on a received first synchronization signal need to be conveyed to the wireless device at some point, e.g. at setup/configuration or via an RRC message. ("setup" may include e.g., in LTE terminology, Connection Setup and/or Tracking Area Update). Further, other a-priori information which may be conveyed to the wireless device from the network is e.g. a set of alternative sequences which may be used as or comprised in a PaSS, and one or more scrambling sequences which may be used for scrambling of the PaSS. This a-priori information is obtained by the wireless device when in non-idle mode, e.g. when in connected mode, or at set up of the association of the wireless device and the node that handles paging, as previously mentioned. The wireless device is configured with the a-priori information at some point before entering the non-active mode, e.g. idle mode or dormant mode. This is illustrated as an action 201 in FIG. 2, followed by the action of entering 202 a non-active mode. FIG. 2 illustrates a more elaborate embodiment of the method as compared to the illustration in FIG. 1.

When the wireless device has received 203 the first synchronization signal, it determines, 103, 204, a paging window in relation to the received first synchronization signal. Such a paging window could be predefined as a certain time period following the received synchronization signal, e.g. a certain time interval starting at or a predefined time after (or before) the obtaining of the first synchronization signal. Specifying the paging window to start a predefined time before, or after, the obtaining of the first synchronization signal would for example apply to a periodically obtainable first synchronization signal, in which case the paging window may start the predefined time before, or after, an occurrence of the periodic first synchronization signal. In the paging window, the wireless device will determine whether a PaSS is received or not. The duration, i.e. length, of the paging window, in which one or more PaSSs may be received, may be fixed, but may also depend on parameters, such as e.g. characteristics of the wireless device. For example, a duration of the paging window may be determined based on a length of a preceding non-active DRX/DTX period; an internal clock type of the wireless device; a type of the wireless device; a minimum paging window duration; and/or on a configuration received before entering non-active, idle or dormant mode, which configuration depends on at least one of the mentioned parameters, i.e. length of a preceding DRX/DTX period, clock type, etc. A start time of a paging window of default or predefined length could be determined 204 relative to the obtaining of the first synchronization signal. The default duration of the paging window could be adapted 205 based e.g. on characteristics of the wireless device, a duration of a preceding non-active DRX/DTX period, and/or characteristics of the obtained synchronization signal. Thereby, a paging window of an adequate length for the wireless device and situation in question may be achieved.

Figure 4:
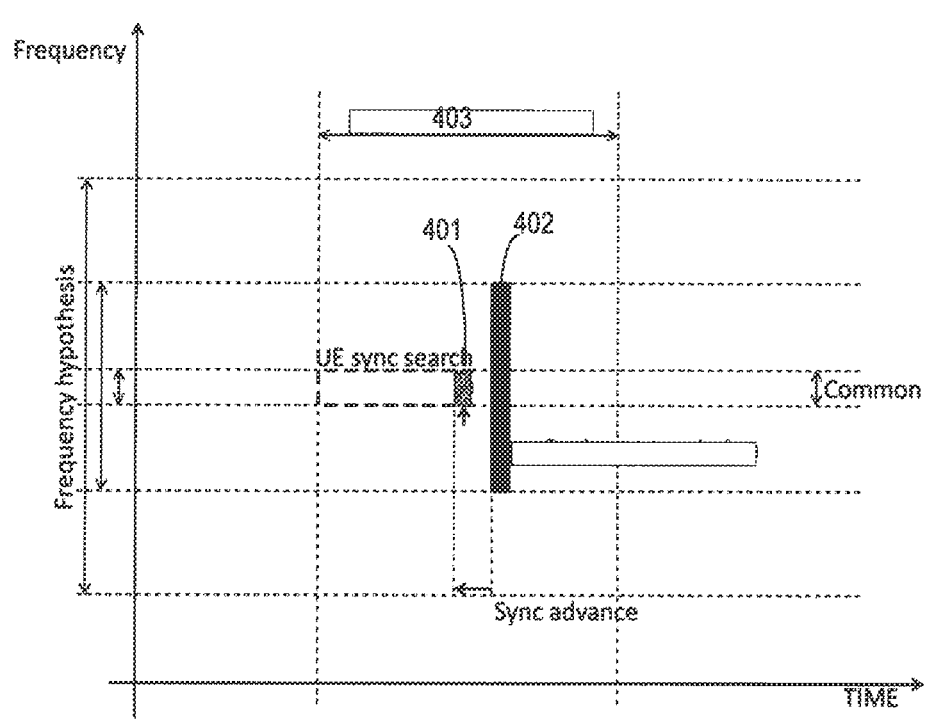
FIGS. 4-10 are schematic illustrations of paging configurations according to exemplifying embodiments.
Figure 5:
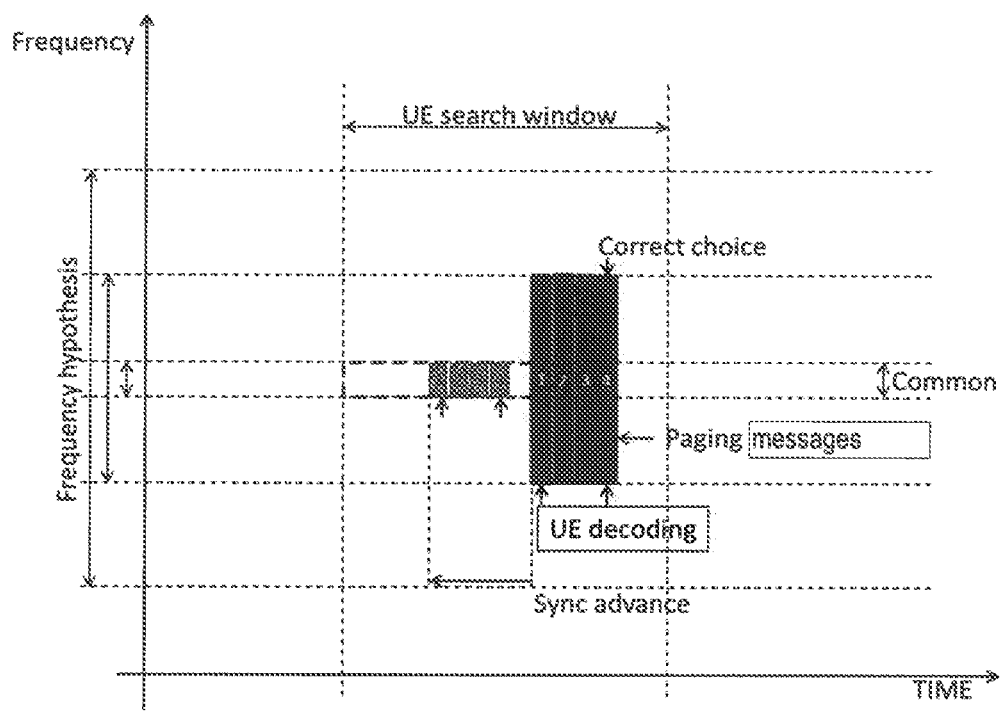
Figure 6:
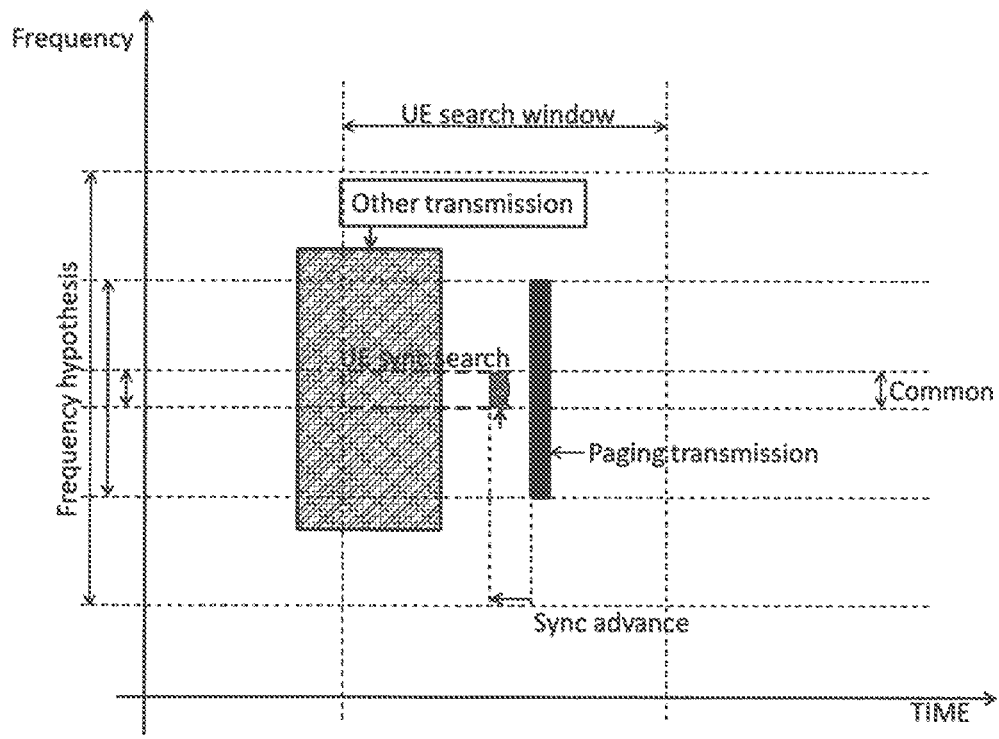

When there is no paging for a wireless device, there will be no PaSS in the paging window. The wireless device will listen, i.e. search, for a PaSS during the paging window. When there is no paging for any wireless device, the paging window may in some embodiments comprise no signals at all, i.e. be void of signals. When detecting e.g. one sequence out of a set of possible PaSS sequences with a signal strength exceeding a threshold, the wireless device may conclude that a PaSS is received and that a paging message will follow the detected and received PaSS. The wireless device may continue to listen for more PaSSs, even though a first PaSS is detected. Depending on the configuration of the wireless device, e.g. on the a-priori information related to the PaSS provided to the wireless device, it will search for the paging message in accordance with information indicated by the received PaSS. For example, the paging message may be expected to arrive a certain time period after the reception of the PaSS. This time period may be indicated or defined as a parameter denoted e.g. "T", or "Sync Advance" (SA) timing. In FIGS. 4-6, a paging message arriving a time period indicated as "Sync advance" after a PaSS is illustrated. The receiving 207 of the at least one paging message may further depend on the location in frequency of the received at least one PaSS and/or on a sequence comprised in the at least one PaSS. Thus, for example, the wireless device may determine when in time and/or where in frequency to receive the at least one paging message based on the received at least one PaSS. For example, a set of different alternative time delays and/or frequency regions could be associated with the PaSS, such that the wireless device listens for the paging message according to the different alternatives in the set. A characteristic of the PaSS may indicate one or more alternative locations in time and frequency from a set of alternatives. In other words, there may be multiple hypotheses of a PaSS, and there may be multiple time/frequency hypotheses per PaSS.

The PaSS may further comprise information on or be indicative of how to decode the associated paging message. For example, the decoding 208 of the at least one paging message may depend on the time of receiving the at least one PaSS, the location in frequency of the received at least one PaSS and/or a sequence comprised in the at least one PaSS. In other words, characteristics of the PaSS may indicate e.g. a DMRS to be used for receiving/decoding the paging message. In case of multiple PaSS, each PaSS can indicate a different DMRS, where the different DMRSs potentially can be associated with separate time/frequency synchronization assumptions for the following paging messages.

The wireless device will thus not need to receive other information in idle/dormant/non-active mode than a system synchronization signal, sometimes denoted "first synchronization signal" herein, for being able to detect/receive the PaSS and then obtain the paging message. The wireless device does further not need to be aware of from which specific network node or nodes the PaSS and paging messages are sent. This means that, expressed in terms of terminology related e.g. to prior art cellular networks, the receiving of the PaSS does not require prior knowledge related to any specific cell or to any specific network node. Such knowledge would typically, in prior art, be derived from cell-specific reference signals received in idle mode in a new cell or from a new network node, e.g. when entering the coverage area of the new cell or network node. The wireless device need not know from which network node a PaSS and/or paging message is transmitted, and will thus listen for PaSS signals from more than one network node, i.e. irrespective of from which network node the PaSS is transmitted. This means that the wireless device receives the PaSS under the assumption that it is non-colocated with the first synchronization signal, and further decodes the paging message under the assumption that it is non-colocated with the first synchronization signal. The PaSS itself may be assumed not to depend on the first synchronization signal.

The PaSS is a signal which is dedicated for paging, and which is associated with a paging message following the PaSS. The paging procedure does not need to depend on the first synchronization signal in other ways than for determining that a PaSS may follow during a paging window related to the first synchronization signal.

Below, exemplifying embodiments from the perspective of a network node will be described with reference to FIG. 3.

Figure 3:
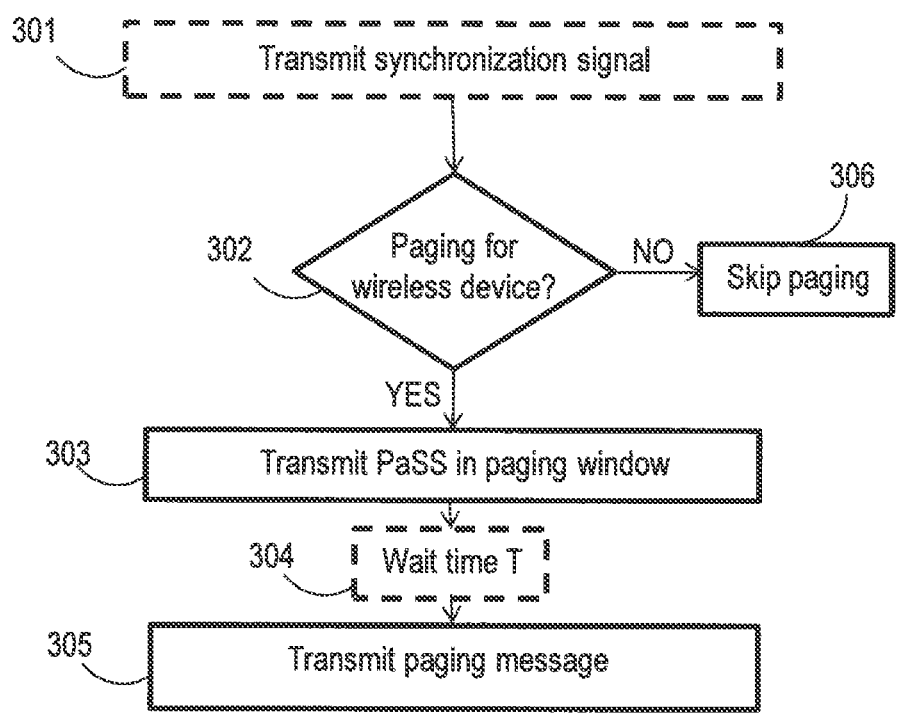
FIG. 3 is a flow chart showing a method performed by a network node according to an exemplifying embodiment.

FIG. 3 illustrates a method for paging of a wireless device in a wireless communication network, the method performed by a network node. The network node may transmit a first synchronization signal S in an action 301. A first synchronization signal could alternatively be transmitted by some other node in the network, and therefore this action has a dashed outline. This action is further not necessarily considered to be part of the paging method, since the transmission of this synchronization signal does not need to be dedicated to paging or adapted for paging, i.e. it may be transmitted for other reasons. The paging method only utilizes this first synchronization signal as an event in time, and possibly in frequency, in relation to which a paging window may be defined.

The network node may be assumed to only transmit a PaSS when there is paging information for a wireless device. This is illustrated by the network node determining 302 whether there is any paging information that needs to be conveyed to a wireless device. When no such information is present, no paging procedure needs to be initiated, which is illustrated by the action "skip paging" 306 in FIG. 3.

When paging of the wireless device is to be made, i.e. when there is paging information to be transmitted and a paging transmission is to be made, the network node transmits 303 at least one PaSS within a paging window defined for the paging transmission. The PaSS is thus comprised in the paging transmission. Then, the network node transmits 305, as part of the paging transmission, at least one paging message. The at least one paging message may be transmitted e.g. a time T, after a corresponding at least one PaSS. The time T may in some embodiments be pre-defined. This is illustrated as action 304 in FIG. 3, having a dashed border to illustrate that the time T is only one example of a relation between the PaSS and the paging message, and that other alternatives are possible (for example there may be a set of alternative time periods). The at least one paging message is associated with the at least one PaSS in that the at least one paging message is configured such that it is obtainable, based on the at least one PaSS. This means that the at least one PaSS should be configured such that the following at least one paging message is e.g. detectable and decodable based on the at least one PaSS. The paging message following the PaSS could, for example, be transmitted using the same synchronization as the PaSS, from the same node, and potentially also using the same or similar antenna weights. The at least one PaSS may comprise information on and/or be indicative of when in time and/or where in frequency the at least one paging message will be transmitted. This information may be used by the wireless device for determining how to receive and decode the at least one paging message following the at least one PaSS. The decoding of the at least one paging message may for example be dependent on the time of receiving the at least one PaSS; the location in frequency of a received at least one PaSS; and/or on a sequence comprised in the at least one PaSS. The sequence may for example be a sequence forming part of or the whole PaSS.

The at least one PaSS and/or at least one paging message may be transmitted in only a part of a coverage area of the network node at a time, e.g. per transmission time interval (TTI). For example, when applying advanced beam-forming, full effect can be used for a beam in one direction while the rest of a coverable area associated with a network node may be left uncovered. The beam may be moved e.g. in the next TTI and then cover another part of the coverable area associated with the network node. This will be further described below. An exemplifying embodiment of a proposed paging channel structure is schematically depicted in FIG. 4. In FIG. 4, a PaSS 401 is illustrated, which is followed by a paging message 402. Further, a paging window, or "UE search window" 403 is outlined, and may represent a time period following e.g. after occurrence or provision (transmission) of a first synchronization signal (not shown). The time period, that constitutes the paging window, may in some embodiments follow immediately upon reception (at the wireless device) of the first synchronization signal, whereas in other embodiments there may be a offset in time between the first synchronization signal and the paging window. In FIG. 4 it may further be seen that in this example, a UE searches in the paging window until a PaSS is received. The search period is indicated as "UE sync search" in FIG. 4. The PaSS is designed to be possible to carry in different transmission modes and carrier bandwidths and also to be supported by different types of wireless devices, e.g. be sufficiently small bandwidth to be supported by, for example, simple MTC devices. A transmission mode is related to the assumption or expectation of a wireless device on channels and reference signals, e.g. demodulation pilots and mapping of data to time/frequency resources.

The PaSS is provided or transmitted e.g. a certain time after a first synchronization signal, and the paging message is provided or transmitted a "sync advance" (SA) timing after the PaSS. These time periods, i.e. the one relative the first synchronization signal and the one relative the PaSS, may be preconfigured and broadcasted or individually configured for a specific wireless device. As seen in FIG. 4, the setting SA=0 would correspond to providing/transmitting the synchronization signal embedded into the paging message, which is a possible configuration, but may not be the preferred option in many use cases, as indicated in the described embodiments below.

A wireless device searches for the PaSS in a search window, also denoted "paging window" herein. The properties of the paging window can e.g. be preconfigured and broadcasted or individually configured for a wireless device or type of wireless devices, as previously described. If a wireless device detects a sufficiently strong PaSS in the search window, e.g. when the received signal is above a threshold, the wireless device will search for a paging message according to the SA timing. If multiple PaSS are above the threshold, the wireless device may search for paging messages according to one or multiple of the detected PaSSs. For example, the wireless device could decode the paging messages, according to the N strongest detected PaSS, where N may be configured or fixed in the standard.

In some embodiments, the wireless device (WD) search window, i.e. the paging window for the wireless device, is configured by a network signaled minimal wireless device (WD) search window (SW) parameter, WD_SW_MIN. The wireless device will then pick a WD_SW≥WD_SW_MIN according to the wireless device implementation. For example, a low quality wireless device with a "bad" clock needs a longer search window than a high quality wireless device with an accurate clock. To save detection energy consumption, a maximum length for the wireless device search window may be determined by the wireless device e.g. according to the wireless device implementation.

Paging Configuration for Coverage with Massive Antenna Arrays

In so-called "massive" MIMO systems, where each node controls a large number, e.g. about 100 antenna elements, the massive antenna arrays enable the system to form very narrow and high gain beams. Such a system can thus use a large number, M, of beams to provide coverage for paging transmissions. But, if the coverage area is large, each beam, e.g. one at a time, may need to be assigned the full power budget to maximize the coverage area. Alternatively, signals can be sent simultaneously in multiple directions, in one TTI, by sharing the power among the different beam directions.

In some embodiments, in order adapt to the use of full power in each beam, the paging channel may be configured such that the SA timing is sufficiently long to allow a wireless device to detect different beam directions, thereby being enabled to make a selection amongst beams for decoding. In this context, the number of detected beams that the wireless device needs to search for paging messages is inversely related to the number of beams that the system needs to use for paging transmissions. In FIG. 5 a schematic example can be seen of a scenario where a wireless device listens to 4≤M beams, of which two, 1 and 4, fulfill the threshold criteria. Hence the wireless device searches for paging messages on these two paging transmission opportunities (marked as "UE decoding" in FIG. 5). But in fact, only beam 4 contains a paging message to the wireless device, since the system here made a (correct) assumption of the location of the wireless device and only transmitted a paging message to the wireless device in beam 4 (beam 1 would also have been OK in this simplified example).

It should be noted that the wireless device in some embodiments also can be configured to do accumulation over multiple PaSSs and/or paging messages. For example, with reference to the example in FIG. 5, the PaSS and paging message may be transmitted in all four beams, 1-4 with power sharing, and the coverage may be achieved by that a wireless device accumulates over the four transmissions. That is, instead of being transmitted once with full power, the PaSS and paging message is transmitted 4 times with ¼th the power, which will achieve the same coverage for the paging. In some embodiments the wireless device may blindly attempt different accumulation options.

In some embodiments both techniques are combined i.e. that the paging signals are transmitted in multiple directions, and in each of said directions repetition is also used. How these two methods to gain signal quality e.g. using directivity and repetition will be combined depends, for example, on how power is shared between beams and the implications on wireless device implementation and paging capacity. For example, repetition could allow for wireless device receive beam-forming even if said beam-forming is achieved using an analog beam-forming implementation.

In some use cases a paging channel is situated on a carrier where there is contention on the radio resources, for example, when using unlicensed spectrum. In this context the timing uncertainty is, at least partly, due to that the channel can be occupied by some other transmission(s), for example, WiFi. In this context the paging will sometimes be forced to wait for the channel to be free before transmitting the paging information, which is schematically depicted in FIG. 6. FIG. 6 illustrates paging search with colliding transmission using contention based channel access. The wireless device search window in this context is expected to be large enough to enable a wireless device search for the paging synchronization signal in resources not occupied by other transmissions.

In some embodiments the system is operating on multiple WiFi channels and the system using contention for the radio resources is a WiFi system. The 5G system then needs to wait for the channel to be free on the common part of a channel that will be used to transmit paging. Typically this will be one WiFi channel and the frequency search space is one or multiple paging positions in different WiFi channels, e.g. the paging is then on a WiFi channel that is free from other traffic e.g. WiFi.

Long DRX/DTX

Figure 7:
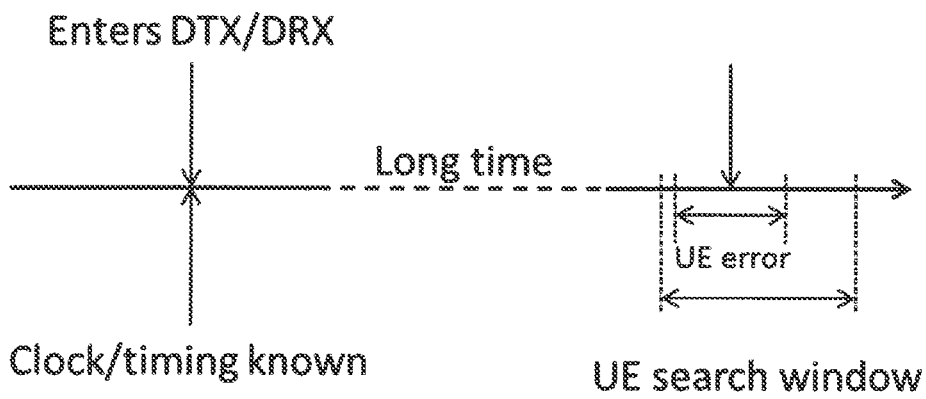

In this context the paging search windows may be determined by the sum of the possible UE clock error, the system internode synchronization errors and also the error in timing caused by the system being reconfigured during the wireless device long DRX/DTX, see FIG. 7. This implies that the system may perform a part of determining and configuring the wireless device search window size, i.e. the length of the paging window for the wireless device, but depending on the clock quality, length of DRX/DTX etc., the wireless device may need to extend the search window or paging window to allow for the wireless device errors, e.g. clock errors. The size of and estimation of the wireless device errors is, for example, left as an implementation specific parameter or regulated in wireless device category specifications. In this context the use, and design, of the paging synchronization signal (PaSS) is very important, e.g. so that the search can be a low overhead correlation search with a known reference signal e.g. much lower overhead, as compared to doing full bandwidth decoding attempts and CRC checks for many possible paging transmissions hypotheses.

Flexible Bandwidth

Figure 8:
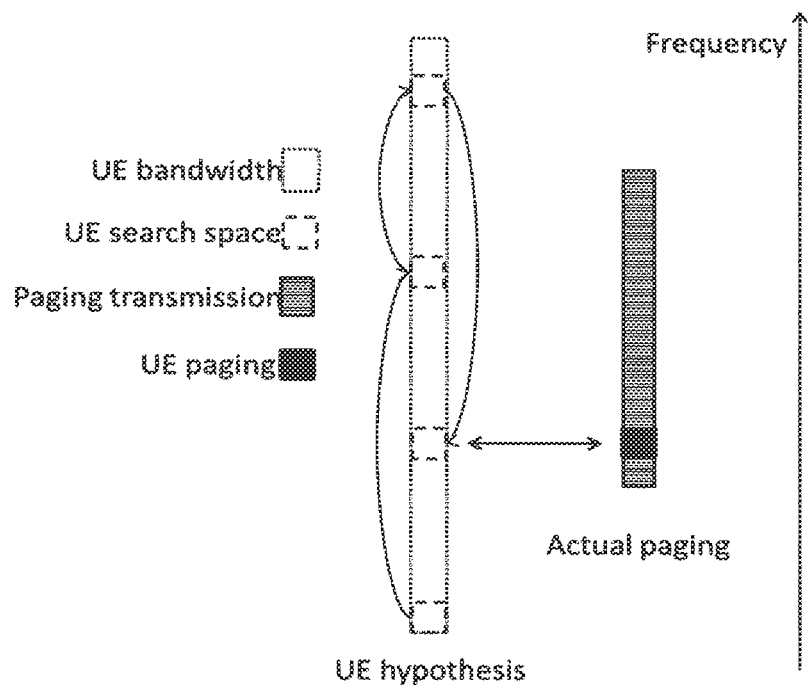

An extension embodiment of the main solution described in this section is to allow flexible bandwidth allocations where the wireless device will do paging detection on different transmitters configured with different transmission modes. In this context a transmission mode will be a restriction on where in frequency the paging transmission will occur. The embodiments described herein enable flexibility in when in time the paging transmission will occur. Hence, in some embodiments the wireless device is restricted in regard of which bandwidth the wireless device can support, and the paging must be made within this supported bandwidth. In some context the carrier is limited in paging bandwidth, due to, for example, limited carrier bandwidth, control signaling on carrier edges etc. In some embodiments some frequency time resources are assigned to other services, for example, critical MTC. If these diverse services are, for example, geographically multiplexed on the same carrier, a wireless device waking up should adapt to the situation without reconfiguration of the paging transmission. The paging message could, however, contain such reconfiguration information. That is, the format of the paging should be fixed, but the paging message can contain information about formats to use for other paging messages. Therefore, in such embodiments the wireless device will be configured (when in active mode) with a paging bandwidth and a search space for the paging message. The search can for example adapt in frequency allocation, DMRS configuration and contain a wireless device specific identification (potentially shared among a group of wireless devices) of the paging data, for example, a CRC check procedure. In FIG. 8 an example is shown, where the search is in frequency domain and the wireless device is configured for a larger frequency allocation than currently used for the paging transmission. It should be noted that the search may also, for example, be performed in DMRS domain for spatially multiplexed paging messages. In some embodiments, the search space is not configured but derived from a wireless device identity.

Flexibility in Paging Capacity

If multiple users can have simultaneous paging the design described in section "Paging configuration for coverage with massive antenna arrays" can also be used for this purpose. That is, instead of distributing the transmissions 1 to 4 over multiple beams they can be transmitted over the same beam but using different paging payload in the paging transmissions 1 to 4. A wireless device message identification procedure may be used to find the correct data, for example, using CRC checks on the transmitted data packets in the wireless device search space.

According to some embodiments of the invention, one or a set of PaSS can also be used to dynamically extend the search window, WD_SW_MIN for that paging occasion. This can be used if the load during a time window or paging window is too high to enable paging of all wireless devices.

In some embodiments the paging payload can be predefined, and the index of the corresponding size will be included in the PaSS for detection. The corresponding size may for example be the size of the paging window, but also other size indications are possible, e.g. payload size.

Wireless Device Configuration and Paging

Figure 9:
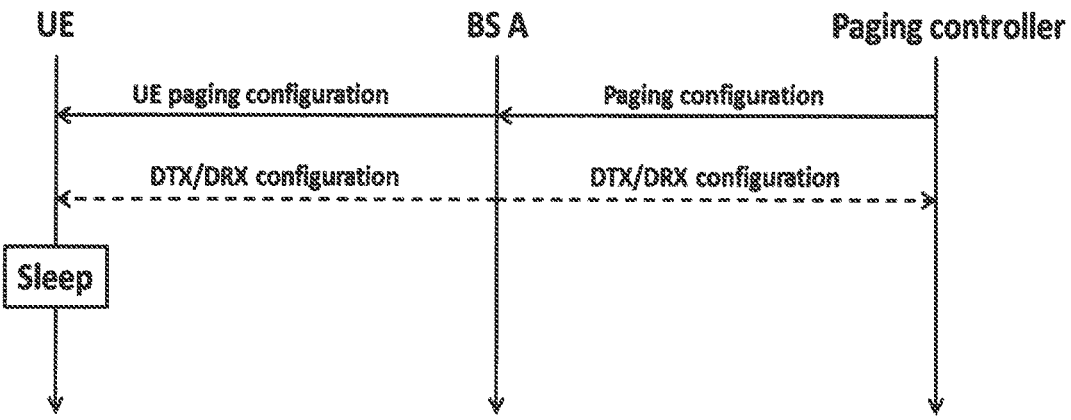

The wireless device may be configured with the parameters described in the above sections. Depending on embodiment, different subsets of the described parameters are dynamically configured by the network. In some embodiments all the paging configurations are done by the paging controller, for example, the MME in LTE. In some embodiments, some additional paging configuration, e.g. DRX/DTX settings, is done by a network node, for example the eNB in LTE, signaling the paging configuration to the wireless device depending on some local knowledge, for example, the data transmissions done to/from the wireless device prior to the wireless device going to sleep, entering a non-active DRX state. This signaling procedure is depicted in FIG. 9.

The configuration may also comprise, apart from DRX/DTX settings, a network configured size WD_SW_MIN of the wireless device paging search window, a SA timing setting, a threshold for detecting paging transmissions/messages and a wireless device procedure for interpretation of the paging synchronization signals. The interpretation may determine how the wireless device should treat multiple detected paging synchronization signals above a threshold. The treatment can, for example, be to listen to a number of paging opportunities and/or how multiple transmissions should be combined. It should be noted that in some embodiments the paging synchronization signal threshold is preconfigured or implicitly set, in some embodiments the threshold is set according to which link adaptation will be used for the data transmitted in the paging transmission, in some embodiments the threshold is dynamically changed depending on a timer, and in some embodiments the threshold is also set according e.g. to standardized requirements related to false detection.

Figure 10:
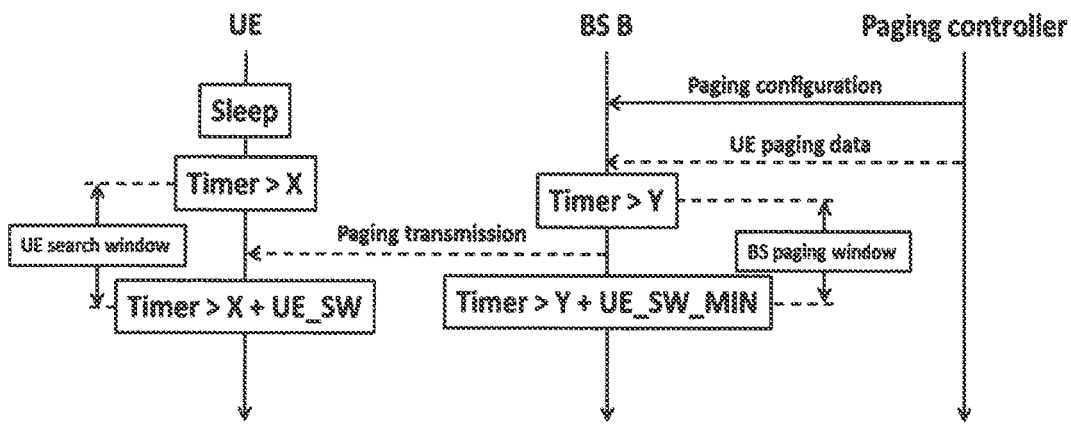

In the paging procedure any network node fulfilling the requirements associated with the wireless device's configuration for paging can be assigned to transmit wireless device paging data in the window for paging that is used by this wireless device. A paging procedure according to an exemplifying embodiment is depicted in FIG. 10 (wireless device denoted UE in FIG. 10). Within the network node (BS B in FIG. 10) paging window the network node can, for example, be asked by the network to transmit in one possible opportunity, e.g. as illustrated in FIG. 4, or in one, for example no. 4, of multiple opportunities, e.g. as illustrated in FIG. 5. The PaSS and paging message can be transmitted in one specific beam, when a specific one of the beams of the network node BS B is a candidate for the wireless device coverage, or be transmitted over multiple beam directions (when, multiple beams of the network node BS B are candidates for wireless device coverage. In the latter case the PaSS and paging message could be transmitted e.g. over 3 beams, such as the beams 1, 3 and 4 of network node BS B (cf. FIG. 5)

The methods and techniques described above may be implemented in wireless devices and network nodes.

An exemplifying embodiment of a wireless device is illustrated in a general manner in FIG. 11a. The wireless device 1100 is capable of short range radio communication, and is operable in a communication network. The wireless device 1100 is configured to perform at least one of the method embodiments described above with reference to any of FIG. 1 or 2. The wireless device 1100 may be assumed to be associated with the same technical features, objects and advantages as the previously described method embodiments. The wireless device will be described in brief in order to avoid unnecessary repetition.

The wireless device may be implemented and/or described as follows;

The wireless device 1100 may comprise processing circuitry 1101 and a communication interface 1102. The processing circuitry 1101 is configured to cause the wireless device 1100 to determine a paging window for receiving at least part of a paging transmission. The processing circuitry 1101 is further configured to cause the wireless device 1100 to receive at least one paging synchronization signal, PaSS, comprised in the paging transmission, in said paging window; and to receive at least one paging message comprised in the paging transmission, based on the received at least one PaSS. The communication interface 1102, which may also be denoted e.g. Input/Output (I/O) interface, may include a wireless interface for sending data to and receiving data from network nodes and/or wireless devices in the wireless communication network.

The processing circuitry 1101 could, as illustrated in FIG. 11b, comprise processing means, such as a processor 1103, e.g. a CPU, and a memory 1104 for storing or holding instructions. The memory would then comprise instructions, e.g. in form of a computer program 1105, which when executed by the processing means 1103 causes the wireless device 1100 to perform any of the actions described above.

An example of implementation of the processing circuitry 1101 is shown in FIG. 11c. The processing circuitry here comprises functional units, such as a determining unit 1106, configured to cause the wireless device to determine a paging window for receiving at least part of a paging transmission. The processing circuitry may further comprise a first receiving unit 1107, configured to cause the wireless device to receive at least one paging synchronization signal, PaSS, comprised in the paging transmission, in said paging window. The processing circuitry may further comprise a second receiving unit 1108, configured to cause the wireless device to receive at least one paging message comprised in the paging transmission, based on the received at least one PaSS. The processing circuitry may further comprise a decoding unit 1109, for decoding the received at least one paging message.

The units 1106-1109 are here illustrated as different units, but could alternatively be one unit configured for these tasks. The processing circuitry could comprise more units; and actions or tasks could alternatively be performed by one of the other units.

The wireless devices described above could be configured for the different method embodiments described herein. The wireless device 1100 may be assumed to comprise further functionality, for carrying out regular wireless device functions.

Figure 12A:
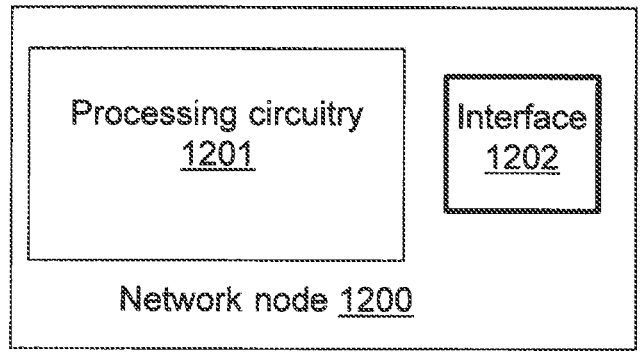
FIGS. 12a-c illustrate different implementations of network nodes according to exemplifying embodiments.

An exemplifying embodiment of a network node or network arrangement is illustrated in a general manner in FIG. 12a. The network node 1200 is operable in a communication network. The network node 1200 is configured to perform at least one of the method embodiments described above with reference e.g. to FIG. 3. The network node 1200 may be assumed to be associated with the same technical features, objects and advantages as the previously described method embodiments. The network node will be described in brief in order to avoid unnecessary repetition.

The network node may be implemented and/or described as follows:

The network node 1200 may comprise processing circuitry 1201 and a communication interface 1202. The processing circuitry 1201 is configured to cause the network node 1200 to when paging of a wireless device is to be made, i.e. when there is paging information to be transmitted and a paging transmission is to be made, transmit, via interface 1202, at least one PaSS in a paging window defined for the paging transmission. The PaSS is thus comprised in the paging transmission. The processing circuitry 1201 is further configured to cause the network node 1200 to transmit, via interface 1202, at least one paging message as part of the paging transmission. The transmitted paging message is configured such that it is obtainable by the wireless device based on the at least one PaSS, as described above. The communication interface 1202, which may also be denoted e.g. Input/Output (I/O) interface, may include a network interface for sending or transmitting data to and receiving data from other network nodes and/or to/from wireless devices.

Figure 12B:
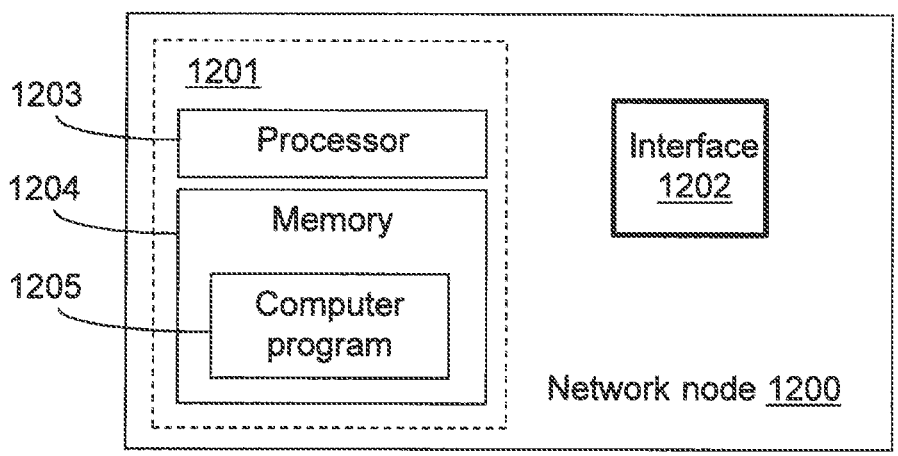

The processing circuitry 1201 could, as illustrated in FIG. 12b, comprise processing means, such as a processor 1203, e.g. a CPU, and a memory 1204 for storing or holding instructions. The memory would then comprise instructions, e.g. in form of a computer program 1205, which when executed by the processing means 1203 causes the network node 1200 to perform any of the actions described above.

Figure 12C:
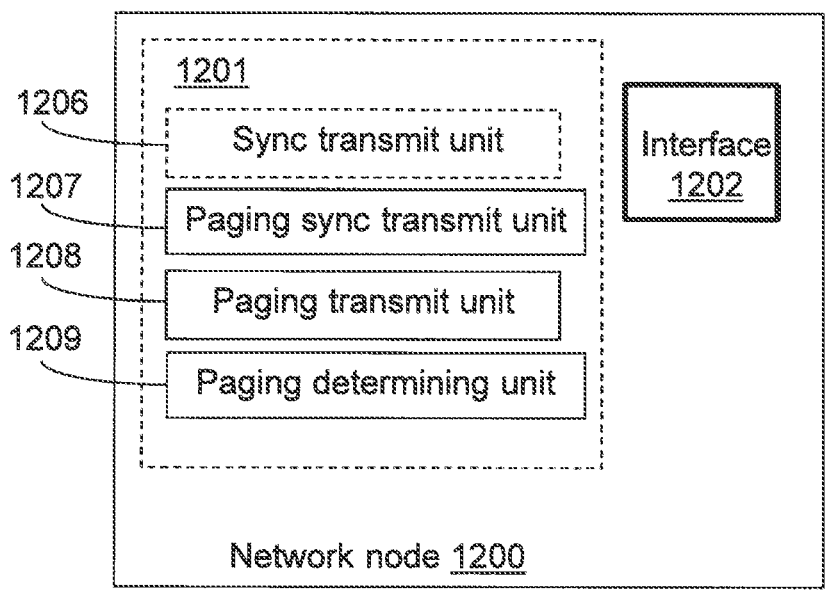

An example of implementation of the processing circuitry 1201 is shown in FIG. 12c. The processing circuitry 1201 here comprises functional units, such as a paging sync transmit unit 1207, configured to cause the network node to transmit, in a paging window defined for a paging transmission, at least one paging synchronization signal, PaSS, comprised in the paging transmission. The processing circuitry 1201 further comprises a paging transmit unit 1208, configured to cause the network node to transmit, as part of the paging transmission, at least one paging message, said at least one paging message being configured such that it is obtainable by the wireless device based on the at least one PaSS. The processing circuitry may further comprise e.g. a sync transmit unit 1206, configured to cause the network node to transmit a first synchronization signal signal, not specific to the paging. The processing circuitry may further comprise e.g. a paging determining unit 1209, configured to cause the network node to determine whether there are one or more wireless devices are to be paged. The units 1206-1209 are here illustrated as different units, but could alternatively be one unit configured for these tasks. The processing circuitry could comprise more units; and actions or tasks could alternatively be performed by one of the other units.

The network nodes described above could be configured for the different method embodiments described herein. The network node 1200 may be assumed to comprise further functionality, for carrying out regular node functions.

The network nodes may be implemented in a distributed manner, e.g. where part of the actions are each performed at different nodes or entities e.g. at different locations in the network. For example, one or more embodiments could be implemented in a so-called cloud solution. The distributed case could be referred to or described as that the method is performed by an arrangement or a network node operable in the communication network, but that the arrangement or the network node could be distributed in the network, and not necessarily be comprised in one physical unit.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Further, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

ABBREVIATIONS

3GPP 3$^{rd}$ Generation Partnership Projekt
BS Base Station
DM-RS Demodulation Reference Signals
LTE Long Term Evolution
MIMO Multiple Input Multiple Output
RAT Radio Access Technology
TTI Transmission Time Interval
UE User Equipment
UESS UE-specific sequence

The invention claimed is:

1. A method for receiving paging in a wireless communication network, performed by a wireless device, the method comprising:
   receiving a configuration message transmitted by the wireless communication network, the configuration message comprising configuration information for determining a paging window for receiving at least part of a paging transmission;
   receiving a network synchronization signal transmitted by the wireless communication network;
   after receiving a network synchronization signal, determining the paging window using the configuration information;
   receiving at least one paging synchronization signal (PaSS) comprised in the paging transmission, in said paging window; and
   receiving at least one paging message comprised in the paging transmission, based on the received at least one PaSS, wherein
   the configuration information for determining the paging window comprises information indicating a time offset between the network synchronization signal and the starting point of the paging window.

2. The method according to claim 1, wherein the receiving of the at least one paging message is dependent on a time at which the at least one PaSS was received.

3. The method according to claim 1, wherein the receiving of the at least one paging message is further dependent on one or both of:
   a location in frequency of the received at least one PaSS;
   a sequence comprised in the at least one PaSS.

4. The method according to claim 1, wherein the determining of a paging window comprises:
   determining a duration of the paging window based on one or more of:
   a length of a preceding non-active period of discontinuous reception/transmission, DRX/DTX;
   an internal clock type of the wireless device;
   a type of the wireless device;
   a minimum paging window duration; and
   a configuration received before entering non-active mode, which depends on at least one of: the internal clock type of the wireless device; the type of the wireless device; and the minimum paging window duration.

5. The method according to claim 1, further comprising:
   determining when in time and/or where in frequency to receive the at least one paging message based on the received at least one PaSS.

6. The method of claim 1, wherein decoding of the received at least one paging message is performed under the assumption that a received network synchronization signal is non-colocated with said at least one PaSS.

7. The method of claim 1, further comprising:
   prior to receiving the PaSS, the wireless device receiving a configuration message transmitted by the wireless communication network, the configuration message comprising information indicating a sequence comprised in the PaSS.

8. A computer program product comprising a non-transitory computer readable medium storing instructions which, when executed on at least one processor, cause the at least one processor to carry out the method according to claim 1.

9. A wireless device operable in a communication network, the wireless device being configured to:
   receive a configuration message transmitted by the wireless communication network, the configuration message comprising configuration information for determining a paging window for receiving at least part of a paging transmission, wherein the configuration information comprises information indicating a time offset between a network synchronization signal transmitted by the wireless communication network and the starting point of the paging window;
   receive the network synchronization signal;
   after receiving the network synchronization signal, determine the paging window using the information indicating the time offset between the network synchronization signal and the starting point of the paging window;
   receive at least one paging synchronization signal (PaSS) comprised in the paging transmission, in said paging window; and
   receive at least one paging message comprised in the paging transmission, based on the received at least one PaSS.

10. The wireless device according to claim 9, configured to receive the at least one paging message in dependency of a time at which the at least one PaSS was received.

11. The wireless device according to claim 9, configured to further receive the at least one paging message in dependency of one or both of:
   a location in frequency of the received at least one PaSS;
   a sequence comprised in the at least one PaSS.

12. A method performed by a network node, the method being for paging of a wireless device in a wireless communication network, the method comprising:
   transmitting a configuration message comprising configuration information for enabling the wireless device to determine a paging window for receiving at least part of a paging transmission;
   transmitting a network synchronization signal;
   transmitting a paging synchronization signal (PaSS) in the paging window;
   transmitting, as part of the paging transmission, at least one paging message, said at least one paging message being configured such that it is obtainable by the wireless device based on the at least one PaSS, wherein there is a predefined time offset between the network synchronization signal and a starting point of the paging window, and the configuration information for enabling the wireless device to determine the paging window comprises information indicating said predefined time offset between the network synchronization signal and the starting point of the paging window.

13. The method according to claim 12, wherein the at least one paging message is transmitted a time, T, after the at least one PaSS.

14. The method according to claim 12, wherein the at least one PaSS and/or at least one paging message is transmitted in a part of a coverage area of the network node at a time.

15. The method according to claim 12, wherein the at least one PaSS comprises information indicating when in time and/or where in frequency the at least one paging message will be transmitted.

16. The method according to claim 12, wherein the at least one PaSS is transmitted only when paging is to be made.

17. The method according to claim 12, further comprising transmitting a first synchronization signal, in relation to which the paging window is defined.

18. The method according to claim 17, wherein the first synchronization signal is transmitted only when paging is to be made.

19. The method of claim 12, wherein configuring the paging window for the wireless device comprises transmitting a configuration message to the wireless device, the configuration message comprising information indicating a sequence comprised in the PaSS.

20. The method of claim 12, wherein configuring the paging window for the wireless device comprises transmitting a configuration message to the wireless device, the configuration message comprising information indicating a criteria for use by the wireless device in determining the defined paging window.

21. The method of claim 20, wherein
the method further comprises transmitting a first synchronization signal, and
the criteria for determining the defined paging window comprises information indicating an offset in time between the first synchronization signal and the starting point of the paging window.

22. A network node operable in a wireless communication network, the network node being configured to:
transmit a configuration message comprising configuration information for enabling the wireless device to determine a paging window for receiving at least part of a paging transmission;
transmit a network synchronization signal;
transmit a paging synchronization signal (PaSS) in the paging window; and
transmit, as part of the paging transmission, at least one paging message, said at least one paging message being configured such that it is obtainable by the wireless device based on the at least one PaSS, wherein
there is a predefined time offset between the network synchronization signal and a starting point of the paging window, and
the configuration information for enabling the wireless device to determine the paging window comprises information indicating said predefined time offset between the network synchronization signal and the starting point of the paging window.

23. The network node according to claim 22, being configured to transmit the at least one paging message a time, T, after the at least one PaSS.

24. The network node according to claim 22, being configured to transmit the PaSS and/or the at least one paging message in a part of a coverage area of the network node at a time.

25. The network node according to claim 22, wherein the PaSS comprises information indicating when in time and/or where in frequency the at least one paging message will be transmitted.

26. The network node according to claim 22, being configured to transmit the at least one PaSS only when paging is to be made.

27. The network node according to claim 22, being further configured to transmit a first synchronization signal, in relation to which the paging window is defined.

28. The network node according to claim 27, being configured to transmit the first synchronization signal only when paging is to be made.

* * * * *